(No Model.)

W. D. WALLACE & V. C. OSBORN.
CORN PLANTER ATTACHMENT.

No. 495,858.                    Patented Apr. 18, 1893.

Witnesses
C. S. Frye
G. T. Myers

Inventors
W. D. Wallace and
V. C. Osborn

By Hopkins & Atkin
Attorneys

UNITED STATES PATENT OFFICE.

WILLIAM D. WALLACE AND VIRGIL C. OSBORN, OF NORTH SALEM, INDIANA.

CORN-PLANTER ATTACHMENT.

SPECIFICATION forming part of Letters Patent No. 495,858, dated April 18, 1893.

Application filed September 1, 1892. Serial No. 444,326. (No model.)

*To all whom it may concern:*

Be it known that we, WILLIAM D. WALLACE and VIRGIL C. OSBORN, both of North Salem, county of Hendricks, and State of Indiana, have invented certain new and useful Improvements in Corn-Planter Attachments, of which the following is a specification, reference being had to the accompanying drawings.

The object of our invention is to produce a comparatively simple device for dropping and drilling corn in rows; and it consists in the combination and arrangement of parts as hereinafter particularly described in the specification and set forth in the claim.

Figure 1:
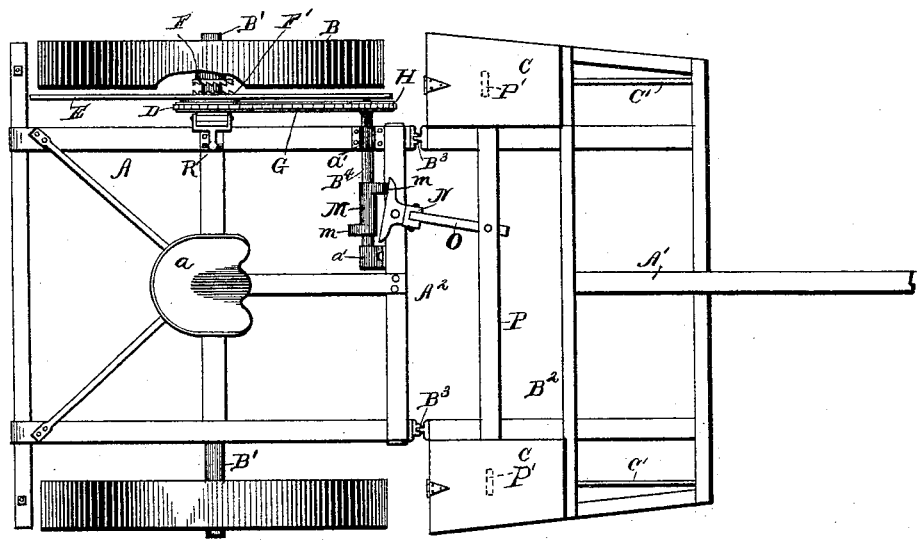
Figure 2:
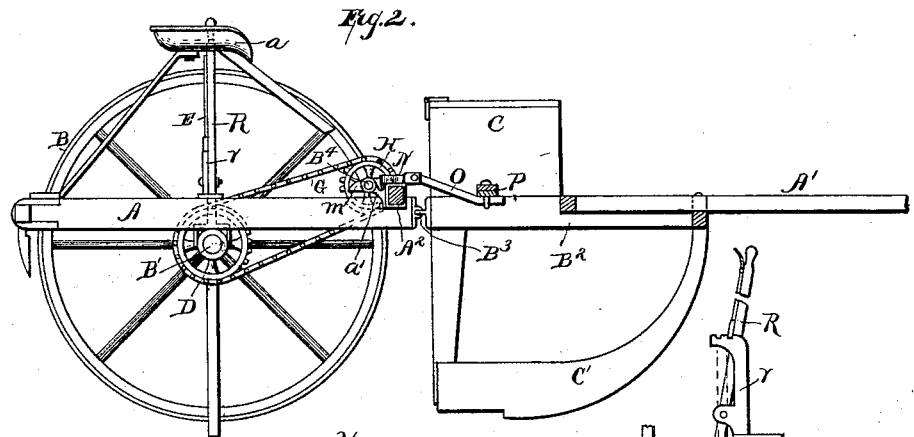
Figure 3:
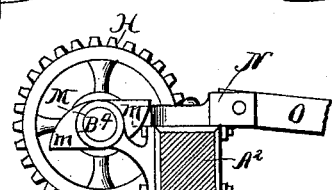
Figure 4:
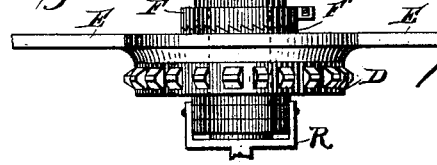

In the accompanying drawings, Figure 1 is a top plan view of a corn planter with our attachment secured in place. Fig. 2 is a central vertical longitudinal section of the same. Fig. 3 is a view of the cam arms and its adjusting parts. Fig. 4 is a view of a section of the drive-wheel; and Fig. 5 is a side elevation of the same.

Referring to the letters on the drawings, A indicates the frame of a corn planter provided with wheels B that are carried on an axle B'.

C indicates hoppers carried upon opposite sides of the runner or furrow opener frame $B^2$ that is hinged at $B^3$ to the wheel frame.

A' indicates a tongue, and C' indicates runners or furrow openers, one on each side of the runner frame, carried in line with the hoppers.

P indicates a seed slide. The ends of the rod P pierce the sides of the hopper and operate to cover and uncover dropper slots P' in the bottom of the runner, so that the slots or openings are alternately opened or closed for the dropping of seed with each travel of the bar.

O indicates a rod pivoted at one end to the bar P, and fastened at the other end to the vibratory piece N that is carried upon the cross-bar $A^2$. The vibratory piece is preferably hinged to the rod O as the runner-frame is hinged to the wheel-frame.

$B^4$ indicates a shaft carried in suitable bearings $a'$ and provided on one end with a sprocket-wheel H.

$m$ indicates cam arms carried suitably, as by a sleeve M, upon the shaft $B^4$. They extend in opposite directions, and are located in the path of the vibratory piece. They have curved edges, as illustrated in Fig. 3, and as the shaft $B^4$ is rotated they alternately strike the vibratory piece and move it alternately in opposite directions upon its pivot, thereby imparting oscillatory movement to the bar P through the rod O.

Loosely mounted upon the axle B' is a sprocket-wheel D which is geared to the sprocket-wheel H by the sprocket-band G. The wheel D is provided on its outer side with a clutch face F'.

F indicates a clutch face upon the hub of the wheel B, for example, and adapted to engage with the clutch face F' of the wheel D. By moving the wheel D to or from the wheel B the former may be caused to rotate, or be rendered stationary at will. For moving the sprocket-wheel D upon the shaft B' a lever R may be employed, carried upon a fulcrum $r$ secured to the frame A.

E indicates markers projecting from the periphery of the wheel D, with which they may be integral.

The operation of our device is as follows: The machine being in motion, a rider upon his seat $a$ operates the lever R to set the wheel B in motion. Thereupon the shaft $B^4$, geared thereto, is caused to rotate and imparts oscillatory motion in the manner above described to the bar P, which operates to drop at regular intervals seed from the hopper C.

We do not limit ourselves to all the details of construction and arrangement herein shown, because they may be varied in many respects without departing from the scope of our invention.

What we claim is—

The combination with the wheel frame and its cross-bar $A^2$, the vibratory lever N fulcrumed thereto, and having a bifurcated central arm, in which is pivoted one end of an oscillating bar O, of the runner or furrow opener frame $B^2$ having hoppers at opposite sides thereof, the seed slide P with its ends piercing the sides of said hoppers, the shaft M having cam arms m adapted to alternately strike the lateral arms of lever N, to reciprocate it, and the pulleys and sprocket chain whereby motion from the driving shaft is imparted to the shaft M, and thence to the lever and reciprocating bar P, substantially as specified.

In testimony of all which we have hereunto subscribed our names.

WILLIAM D. WALLACE.
VIRGIL C. OSBORN.

Witnesses:
W. J. K. P. JONES,
WILLIAM H. HACKLEY.